(12) United States Patent
Smith

(10) Patent No.: US 6,602,591 B1
(45) Date of Patent: Aug. 5, 2003

(54) AUTOMOTIVE TRIM WITH CLEAR TOP COAT AND METHOD OF MAKING SAME

(75) Inventor: Henry H. Smith, Whales, MI (US)

(73) Assignee: Guardian Automotive Trim, Inc., Warren, MI (US)

( * ) Notice: Subject to any disclaimer, the term of this patent is extended or adjusted under 35 U.S.C. 154(b) by 0 days.

(21) Appl. No.: 09/716,430

(22) Filed: Nov. 21, 2000

Related U.S. Application Data

(62) Division of application No. 09/210,852, filed on Dec. 15, 1998, now Pat. No. 6,187,233.

(51) Int. Cl.⁷ .......................... B32B 15/00; B32B 3/10; B32B 27/00; B32B 9/00; B60R 13/00
(52) U.S. Cl. .................... 428/220; 428/208; 428/46; 428/31; 428/422
(58) Field of Search .......................... 428/220, 46, 422, 428/208, 31

(56) References Cited

U.S. PATENT DOCUMENTS

| | | | |
|---|---|---|---|
| 4,403,004 A | * | 9/1983 | Parker et al. ................. 428/31 |
| 4,828,637 A | | 5/1989 | Mentzer et al. |
| 4,830,892 A | * | 5/1989 | Nussbaum .................. 428/31 |
| 4,902,557 A | | 2/1990 | Rohrbacher |
| 4,931,324 A | | 6/1990 | Ellison et al. ............... 428/31 |
| 4,957,802 A | | 9/1990 | Mentzer et al. |
| 5,037,680 A | | 8/1991 | Papendick et al. |
| 5,122,905 A | * | 6/1992 | Wheatley et al. .......... 359/586 |
| 5,226,998 A | | 7/1993 | Few |
| 5,300,587 A | | 4/1994 | Mascia et al. |
| 5,306,548 A | | 4/1994 | Zabrocki et al. |
| 5,316,703 A | | 5/1994 | Schrenk |
| 5,342,666 A | | 8/1994 | Ellison et al. ............... 428/46 |
| 5,409,653 A | | 4/1995 | Malm |
| 5,441,816 A | | 8/1995 | Grohman |
| 5,455,289 A | | 10/1995 | Caselli |
| 5,478,516 A | | 12/1995 | Malm et al. |
| 5,486,327 A | | 1/1996 | Bemis et al. |
| 5,496,630 A | | 3/1996 | Hawrylko et al. |
| 5,525,675 A | * | 6/1996 | Masuda et al. ............ 525/194 |
| 5,532,045 A | | 7/1996 | Wade |
| 5,545,448 A | | 8/1996 | Ford et al. |
| 5,562,931 A | | 10/1996 | Takeuchi |
| 5,599,608 A | | 2/1997 | Yamamoto et al. |
| 5,707,697 A | | 1/1998 | Spain et al. |
| 5,725,712 A | | 3/1998 | Spain et al. |
| 5,750,234 A | | 5/1998 | Johnson et al. |
| 5,759,477 A | | 6/1998 | Yamamoto |
| 5,772,827 A | | 6/1998 | Malm |
| 5,811,053 A | | 9/1998 | Ota et al. |
| 5,866,054 A | | 2/1999 | Dorchester et al. |
| 5,912,283 A | | 6/1999 | Hashizume et al. |
| 5,916,643 A | | 6/1999 | Spain et al. |
| 5,919,537 A | | 7/1999 | Niazy |
| 5,939,195 A | | 8/1999 | Allen et al. |
| 6,017,989 A | | 1/2000 | Malm et al. |
| 6,187,233 B1 | | 2/2001 | Smith |
| 6,319,438 B1 | | 11/2001 | Smith et al. |

FOREIGN PATENT DOCUMENTS

| | | |
|---|---|---|
| DE | 41 16 437 | 11/1991 |
| EP | 0 419 001 | 3/1991 |
| EP | 0 864 417 | 9/1998 |
| EP | 0 868 995 | 10/1998 |
| GB | 2 323 554 | 9/1998 |

* cited by examiner

Primary Examiner—Cynthia H. Kelly
Assistant Examiner—L. Ferguson
(74) Attorney, Agent, or Firm—Nixon & Vanderhye P.C.

(57) ABSTRACT

An exterior automotive trim product, and method of making the same. In certain embodiments, a color pigmented thermoplastic layer is provided. A transparent clear coat is calendared to the color pigmented layer to form a composite or laminate. The laminate is subsequently vacuum-formed into a three dimensional shape approximating the desired shape of a final trim product. The vacuum-formed laminate is then inserted into an injection molding device, and semi-molten resin injected into the mold cavity behind the laminate. The resin fuses with the vacuum-formed laminate with the result being the final automotive trim product. Thus, no spray painting or spraying of solvents is required, and burdensome dry paint transfer techniques may be avoided.

17 Claims, 13 Drawing Sheets

Fig. 1 (Prior Art)
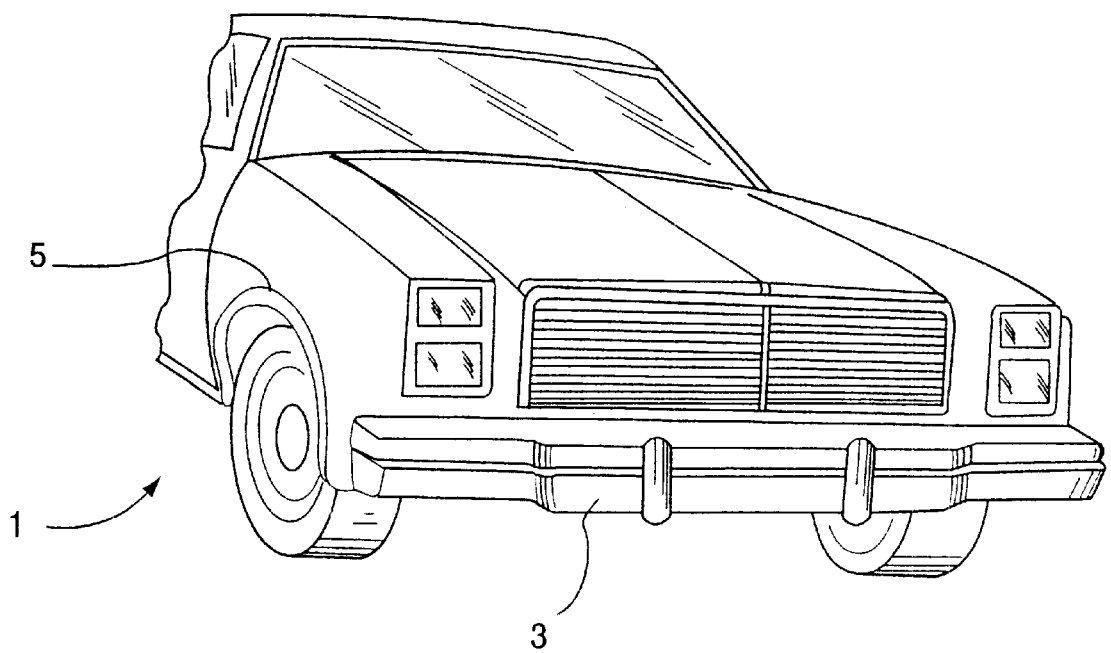
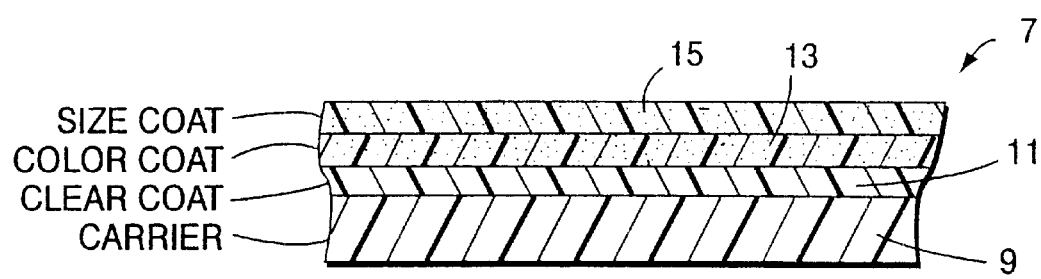
Fig. 2 (Prior Art)

AUTOMOTIVE TRIM WITH CLEAR TOP COAT AND METHOD OF MAKING SAME

This is a division of application Ser. No. 09/210,852, filed Dec. 15, 1998, now U.S. Pat. No. 6,187,233.

This invention relates to trim components for automobiles and similar vehicles, as well as to methods of making same. More particularly, this invention relates to exterior components of such vehicles which are provided for either appearance purposes or are of a size and shape to make a visual contribution to the exterior appearance of a vehicle.

BACKGROUND OF THE INVENTION

It is known to apply automotive trim pieces to the exterior of wheeled vehicles such as cars and trucks. Examples of such trim include accent stripes, side door bumper elements, claddings, wheel covers, grills, and bumper fascia. The instant invention further applies to exterior vehicle components which have previously been made of plastic materials, such as door sides and the like.

In the prior art, exterior molded automotive trim components are typically painted in order to provide them with color. It is desirable that the paint color be compatible with the appearance of the vehicle (e.g. the same as that of the vehicle, or complimentary thereto). Following painting of a molded piece of trim, a clear coat is often sprayed over the-paint to give it luster.

Prior to painting molded trim, it has often been necessary to prepare the exterior surfaces of such components by applying a primer which promotes adhesion of the paint to the surface of the molded component. After the paint is applied over the primer by spraying, the color appearance of the final product results from the pigmentation of the paint layer which is sandwiched between the sprayed-on clear coat and the underlying primer.

Unfortunately, spray painting of molded components for use on vehicles is often undesirable due to the potential for resulting paint lines, a need for masking tape, and the corresponding labor involved. Moreover, spray painting is undesirable due to the high capital equipment cost associated with paint line equipment, and potentially hazardous environmental issues relating to required solvents and the like. Thus, it will be apparent to those of skill in the art that it would be desirable if automotive trim components could be manufactured in a manner so that they were color compatible with automotive exteriors, without the need for spray painting the molded components.

It is also known to manufacture automotive exterior plastic components simply as a product in the condition which it comes out of the mold (i.e. without painting). For such components, the plastic which is used to injection mold the component may include color pigmentation so that the desired color appears not only on the surface but throughout the molded article. Unfortunately, the surface of such molded components, while initially presenting a desirable color, lacks luster and also can be easily scratched and/or marred to further detract from its lack of luster.

Molded automotive trim components have numerous requirements or desires known by automotive manufacturers. It is desirable that such trim components maintain their form without becoming too soft in hot weather conditions, or too brittle in cold weather. Such products should also be capable of holding up and withstanding exposure to ultraviolet (UV) rays of the sun. It is also desired that certain components be capable of a certain amount of flexibility without permanently deforming or denting. It is desirable that surface appearances of such components exhibit considerable luster.

Another approach to automotive trim coloring includes the use of dry paint film. A dry paint-coated laminate can be utilized to replace conventional spray paint. The dry laminate is made by applying a paint coat to a casting sheet by way of conventional paint coating techniques. The dried paint coat is then transferred from the casting sheet to a trim panel by way of known dry paint transfer technology. The laminate may later be thermo-formed into a three dimensional shape and then bonded or integrally molded to an underlying plastic car body member or panel. Such known dry paint film technology is disclosed, for example, in U.S. Pat. No. 5,725,712, the entire disclosure of which is incorporated herein by reference.

Prior art FIGS. 1–10 will be referred to for the purpose of describing conventional dry paint film technology for application to automotive trim components. FIG. 1 illustrates a conventional automobile, which includes numerous exterior plastic molded body components which may be colored. Automobile 1 in FIG. 1 includes bumper fascia 3, wheel covers 5, and many other exterior components which may be made via injection molding technology.

The '712 patent describes a system for coloring automotive trim components. The first step in this dry paint film approach is the provision of the dry laminate 7 of FIG. 2. Laminate 7 includes self-supporting carrier sheet 9 (i.e. casting film), clear coat 11, paint coat 13, and optional size coat 15 for providing adhesion to a backing sheet in a subsequent laminating step. In order to manufacture laminate 7, clear coat 11 is coated onto carrier 9 by a complicated reverse roll coating process shown in prior art FIG. 3, in which clear coat lacquer is contained in coating pan 17. Applicator roll 19 picks up lacquer from the pan and coats it onto carrier film 21 (or 9) after it passes over guide roll 23. After exiting the nip (or die) between applicator roll 19 and rubber backup roll 25, the coated carrier film 27 passes to a multiple zone drying oven. The laminate is dried in the oven at temperatures of from about 250°–400° F. via a multi-stage drying process. After drying, a two layered laminate, including carrier 9 and clear coat 11, is provided.

Color coat 13 is then bonded to clear coat 11 after the clear coat has dried on carrier 9. Color paint coat 13 is typically applied to the carrier by reverse roller coating techniques as shown in FIG. 3, with the color coat being dried by passing it through the multiple drying zones discussed above in curing the clear coat. Thus, the complicated reverse rolling techniques and multi-zone drying ovens of FIG. 3 must be utilized on numerous occasions in order to apply the clear coat and the color coat to the carrier.

Size coat 15 is next coated onto paint coat 13, and is typically applied as a thermoplastic and dried in the same multi-step drying step utilized above for the clear and color coats. The result is laminate 7 of FIG. 2.

Laminate 7 is next laminated to a thermo-formable backing sheet by dry paint transfer laminating techniques shown in FIG. 4, to form laminate 29 of FIG. 5. During this burdensome laminating step of FIG. 4, paint-coated laminate 7 is stored on unwind roll 31 and a flexible 20 mil thick ABS backing sheet 33 is stored on unwind roll 35. When rolls 31 and 35 unwind as shown in FIG. 4, and the webs respectively pass over drums 37, paint-coated laminate 7 and ABS sheet 33 are bonded together between heated laminating drum 39 and roll 41. Laminate 7 is bonded to sheet 33 as the two pass between rolls 39 and 41. The resulting laminate 29 then passes onto storage drum 43. The result is a roll of the laminate 29 of FIG. 5, including a color determined by the colored pigment in paint layer 13. Laminate 29 includes backing sheet 33, size coat 15, color coat 13, and clear coat 11.

Next, laminate 29 is thermo-formed into a desired three dimensional shape. Referring to FIG. 6, laminate 29 is placed inside clamping frame 45 of a vacuum-forming machine. Frame 45 is moved into oven 47 for heating laminate 29. Backing sheet 33 is heated in oven 47 and laminate 29 sags as shown at 49. Then, clamping frame 45 is moved back to the position above vacuum-forming buck 51. The preheated laminate 29 is next vacuum-formed into a desired three dimensional shape by drawing a vacuum on buck 51 through connection 53 to a vacuum pump, and buck 51 is raised to its FIG. 7 position. Vacuum is pulled through holes in buck 51 to force the pre-heated plastic of laminate 29 into the shape of the working surface of buck 51.

Next, the thermo-formed three dimensionally shaped laminate 29 is bonded to a substrate panel as shown in FIGS. 8–9. Laminate 29 is placed into an injection mold and fused to the face of an injection molded substrate 55. FIG. 8 shows preformed laminate 29 placed in the mold cavity between front and rear mold halves 57 and 59. The inside surface 61 of mold half 57 nearly identically matches the exterior contour of paint-coated laminate 29. Surface 61 may be a rigid, high gloss, highly polished surface which is substantially free of surface defects so that no or few defects are transferred to the high gloss, clear coated surface of the laminate. After laminate 29 is in place, semi-molten injection molding material 55 is injected into the mold through passage 63 behind pre-formed laminate 29. The molding material conforms to the shape of the mold cavity and is permanently fused to backing sheet 33 of laminate 29 in the mold. A cross-section of the resulting three-dimensionally molded trim component is shown in FIG. 10.

As can be seen above, dry paint film transfer technology is very burdensome and complicated. For example, the aforesaid process illustrated in FIGS. 1–10 requires going through rollers and dryers on numerous occasions, as well as the required length of time to do same. The process is very expensive due to the process requirements and materials. Moreover, it has been found that the life span of such trim components may be limited because they lose color quickly upon exposure to heat, sun, chemicals, and the like. The requirements for all of the rollers, drums, laminates, vacuum-forming dies and processes, and injection molding equipment is very expensive. The cost of tooling is very high due to the requirement of vacuum-form tooling, injection tooling, trim tooling, drums and rollers, and the like. Moreover, the trimming of materials after placement into the vacuum-forming and injection cavities results in much waste, and lower yields. Problems have also been experienced with regard to maintaining DOI (depth of image), in that DOI may be lost due to deep draws in the components. Depth of pockets or corners in the final molded components is also limited due to the dry paint film, as it may not be over-stretched or it will lose color and/or gloss.

U.S. Pat. No. 5,037,680, incorporated herein by reference, discloses an exterior automotive component with a pigmented substrate and a clear coating thereon. The substrate may be of a thermoplastic polyolefin. Unfortunately, the clear coating material in the '680 patent is deposited onto the substrate in liquid form, e.g. spraying, brushing, dipping, flow coating, etc. This spray or wet application is undesirable for the reasons set forth above (e.g. environmental concerns, need for solvents, expensive equipment required, etc.).

It is apparent from the above, that there exists a need in the art for colored and molded automotive trim components which: (i) may be manufactured without the requirement of prior art dry color paint film transfer; (ii) are colored so as to match or compliment a color of the surrounding vehicle; (iii) may be manufactured at a lesser cost than conventional dry paint film techniques; (iv) have an adequate life span upon exposure to heat, sun, chemicals, and the like; (v) may be manufactured without the requirement of needing to pass through chrome rollers and/or dryers on multiple occasions; (vi) may be manufactured without excessive capital expenditure; (vii) may be manufactured without wasting large amounts of trimmed off materials; (viii) maintain DOI; (ix) are scratch resistant, have luster, and are resistant to marring; (x) have high gloss and retention of same; (xi) have color uniformity; (xii) are resistant to gasoline and solvents, and acid spotting; (xiii) have satisfactory hardness and abrasion resistance; (xiv) have satisfactory impact strength; (xv) have acceptable UV resistance; (xvi) are resistant to water and humidity exposure; and or may be manufactured without the need to "spray" on or otherwise apply a clear coat in liquid form. There exists a need in the art for molded trim products having any or all of the aforesaid characteristics, as well as methods of manufacturing the same.

It is a purpose of this invention to fulfill any and all of the above-described needs in the art, as well as other needs which will become apparent to the skilled artisan from the following detailed description of this invention.

SUMMARY OF THE INVENTION

All object of this invention is the provision of an exterior automotive trim component which is simple to construct, economical to manufacture, and effective in operation.

It is an object of this invention to provide an exterior automotive trim component which is provided for exterior appearance purposes defining color which matches or compliments a surrounding color of a vehicle.

It is another object of this invention to provide a color pigmented molded substrate upon which a substantially transparent clear coat is provided or bonded in a non-wet or non-liquid manner. The colored substrate, in combination with the overlying clear coat, provides a composite molded trim component having the durability, gloss and other appearance properties necessary for satisfactory exterior automotive use.

It is another object of this invention to eliminate the need for prior art dry color paint film transfer technology, and to eliminate the need for spray painting of molded automotive trim components.

It is still another object of this invention to place a thin clear coat layer laminated to a color pigmented plastic substrate into an injection mold, and inject additional plastic into the mold in semi-molten form behind the clear coat/color laminate in order to manufacture a molded automotive trim component including at least three layers.

Yet another object of this invention is to vacuum-form or thermoform the composite of the clear coat and color pigmented substrate together into a skin, and then to insert the vacuum-formed laminate into an injection mold cavity and inject additional plastic material behind it in order to make a molded automotive trim component.

Another object of this invention is to make an automotive trim component by only vacuum-forming a composite laminate of a thin clear coat and a thicker underlying pigmented substrate.

Another object of this invention is to place a clear coat layer laminated to a carrier (e.g. polyester or the like) into the cavity of an injection molding apparatus, and then to injection semi-molten color pigmented material into the cavity behind the laminate so that the color pigmented material contacts and bonds with the clear coat and the final trim product conforms with the shape of the cavity mold. The carrier can be peeled off of the clear coat after the product has been cooled and removed from the injection molding apparatus.

Yet another object of this invention is to extrude a color pigmented plastic substrate, vacuum-form the same into a skin, thereafter place it into an injection mold and inject additional colored or non-colored plastic behind it, cool it, with the result being a molded and colored automotive trim component.

In other embodiments of this invention, it is an object of this invention to simulate glass by providing all layers of the method and/or resulting product substantially transparent (at least about 70% transparent) to visible light. In such embodiments, the products may be used in place of glass windows on automobiles and other types of vehicles. Alternatively, in still other embodiments of this invention, methods of certain embodiments herein may be used to produce products that simulate tinted glass with all layers of such products preferably being at least about 20% transparent to visible light.

This invention further fulfills the above described needs in the art by providing a method of making a colored automotive trim product, the method comprising the steps of:

providing a substantially transparent clear coat layer on a carrier layer to form a clear coat laminate;

calendaring the clear coat laminate to a colored substrate including color pigment material therein using at least first and second rollers to form a colored laminate including the clear coat, the carrier layer, and the colored substrate, the colored substrate being opaque to visible light;

thermoforming the colored laminate into a desired three dimensional shape in a vacuum-forming apparatus to provide a thermoformed colored laminate;

providing the thermoformed color laminate in a cavity of an injection molding apparatus;

injecting flowable resin into the cavity of the injection molding apparatus behind the thermoformed color laminate to provide a colored trim product having at least three layers; and removing the carrier from the trim product.

This invention further fulfills the above described needs in the art by providing a method of making a colored automotive trim product, the method comprising the steps of:

providing a substantially transparent clear coat layer (77) on a carrier layer (78) to form a clear coat laminate;

thermoforming the clear coat laminate into a desired three dimensional shape;

placing the clear coat laminate into a cavity of an injection molding apparatus; and injecting a flowable colored material into the cavity of the injection molding apparatus behind the clear coat laminate to form a three dimensionally molded colored product;

removing the carrier from the clear coat; and using the three dimensionally molded colored product as a trim product on a vehicle.

This invention further fulfills the above-described needs in the art by providing an automotive trim product comprising:

a color pigmented layer having a tensile strength of at least about 10,000 psi and a thickness of at least about 0.050 inches;

a substantially transparent clear coat at least about 90% transparent to visible light rays, the color pigmented layer and the clear coat being included in a three-dimensionally shaped and thermoformed laminate; and said thermoformed laminate useable as an automotive trim product, wherein said laminate has a gloss retention of at least about 95%.

This invention will now be described with respect to certain embodiments thereof, along with reference to the accompanying illustrations.

IN THE DRAWINGS

FIG. 1 is a prior art perspective view of an automobile.

FIG. 2 is a prior art side cross-sectional view of a paint-coated carrier having a clear coat thereon.

Figure 22:
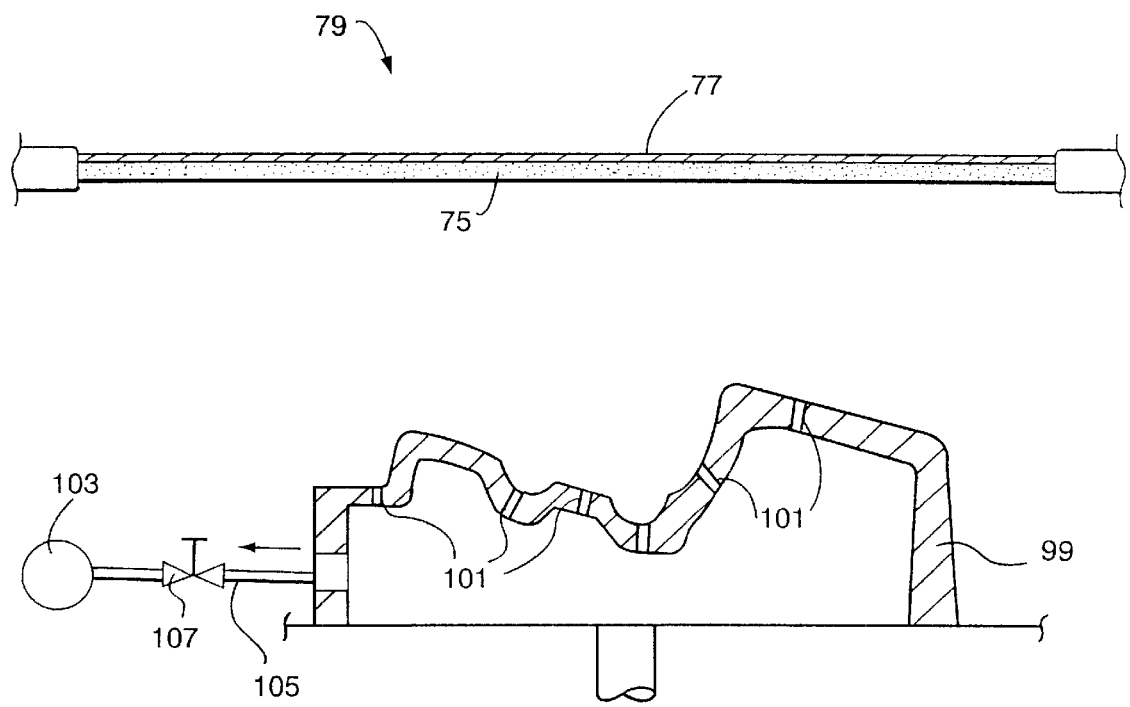
FIG. 22 is a cross-sectional view illustrating the positioning of a color pigmented substrate and overlying clear coat laminant in a vacuum-forming device according to an embodiment of this invention.
Figure 23:
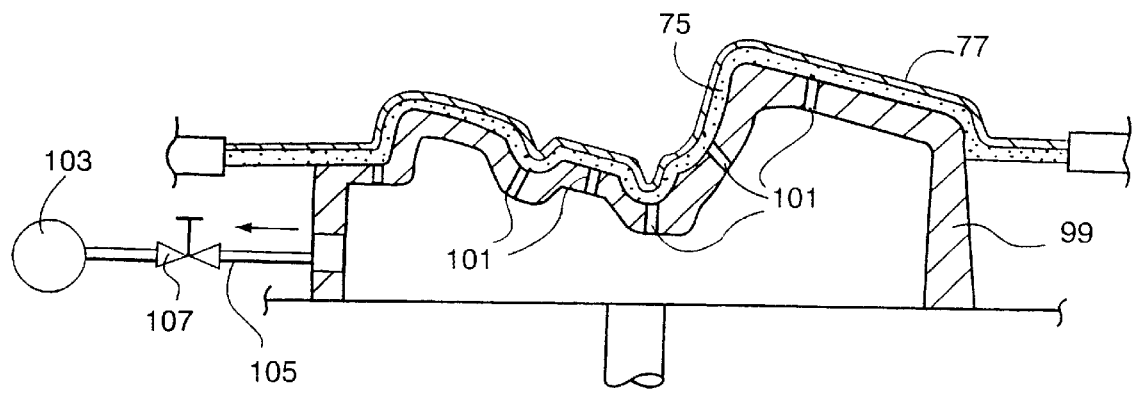

FIG. 23. is a side cross-sectional view illustrating vacuum-forming of the laminate of FIG. 22.

Figure 24:
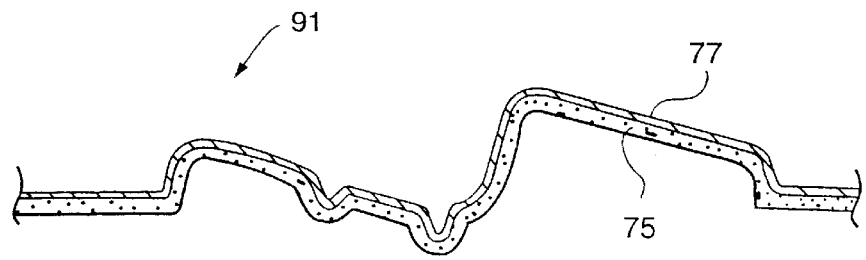

FIG. 24 is a side cross-sectional view of the three dimensionally molded laminate resulting from the process of FIGS. 22–23.

Figure 25:
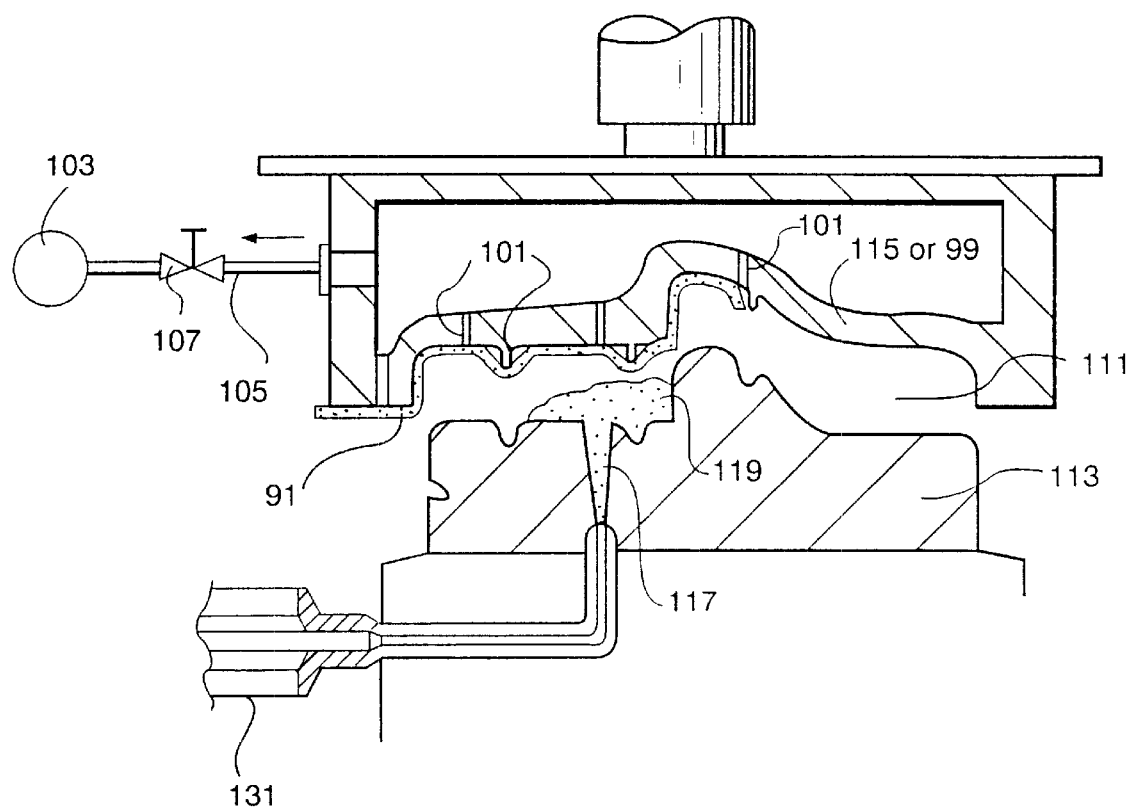

FIG. 25 is a side cross-sectional view illustrating the molded laminate of FIG. 24 being placed into an injection molding device, and plasticized or semi-molten material thereafter being injected into the molding cavity behind the pre-formed laminate in order to make a molded automotive trim component according to an embodiment of this invention.

Figure 26:
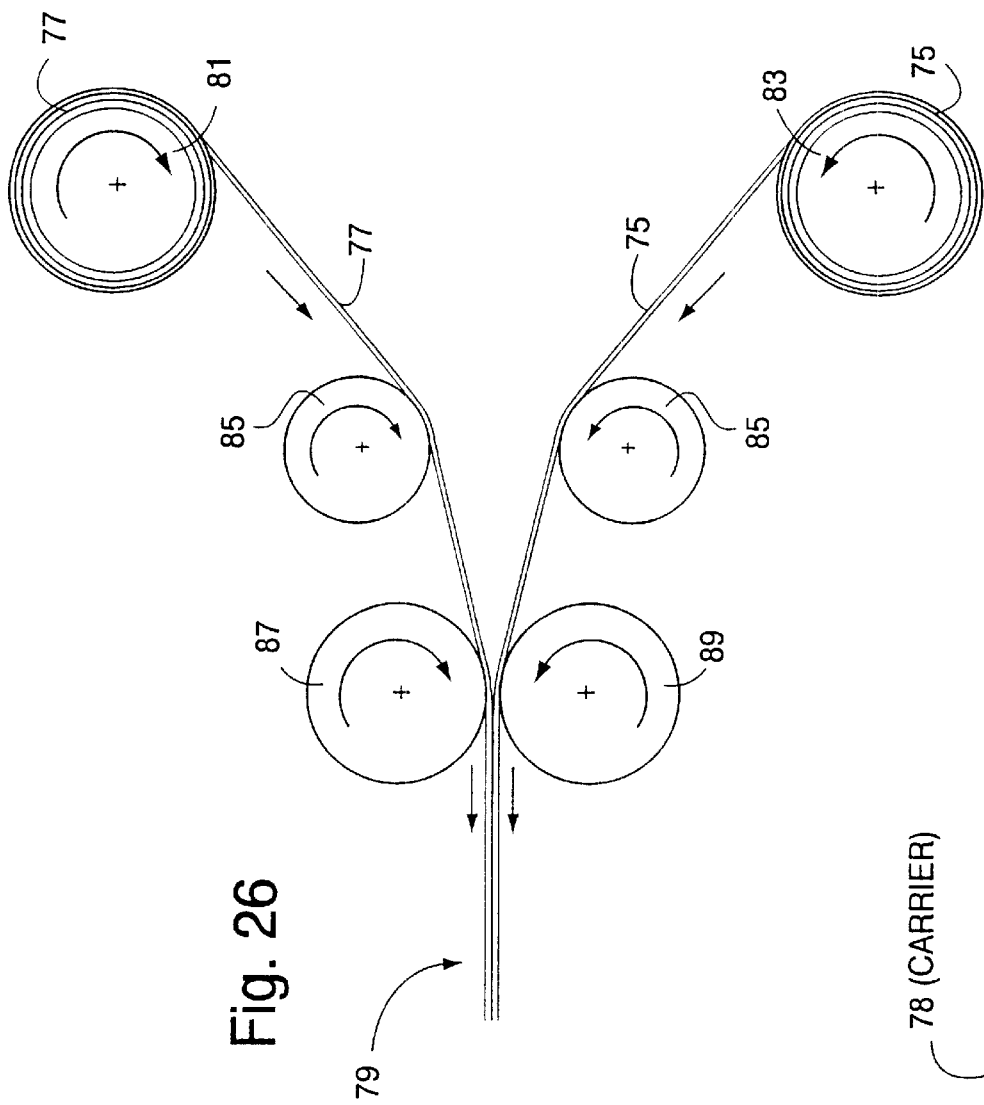

FIG. 26 is a schematic diagram illustrating a roller apparatus for bonding together a clear coat layer and a color pigmented thermoplastic layer according to one embodiment of this invention.

Figure 27:
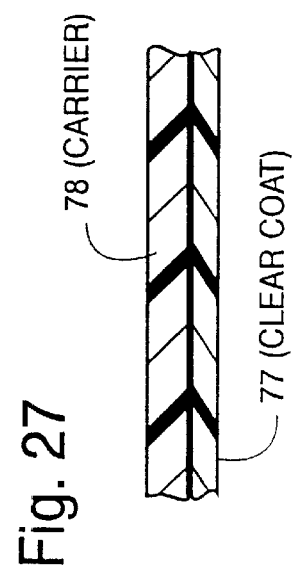

FIG. 27 is a cross sectional view of a portion of a laminate including a clear coat layer mounted on a carrier layer in certain embodiments of this invention. The carrier is removed after the laminate has been thermoformed in an injection molding device or a vacuum-forming apparatus. The carrier may be removed manually by peeling.

DETAILED DESCRIPTION OF CERTAIN EMBODIMENTS OF THIS INVENTION

Referring now more particularly to the accompanying drawings in which like reference numerals indicate like parts throughout the several views.

It should be understood that trim products in accordance with certain embodiments of this invention are adapted to be mounted on vehicles such as that illustrated in prior art FIG. 1, as well as all other types of automotive vehicles including sedans, station wagons, limousines, trucks, and the like. The instant invention relates to the construction of trim components adapted for use on the exterior of automotive vehicles. The components are to be provided for exterior appearance purposes so as to either match the color of the corresponding vehicle, or to compliment the color of the corresponding vehicle. Exemplary automotive trim products which may be made in accordance with the methods disclosed herein include wheel covers, door sides, bumper fascia, trunk lids, claddings, body side moldings, roof moldings, beltline moldings, window moldings, grills, and the like. In other embodiments, entire exterior automobile body panels such as hoods, door panels, quarter panels, trunks, and the like may be made in accordance with methods and resulting products of this invention. In certain other embodiments, methods and products herein may be utilized a components on devices other than automobiles, such as on snowmobiles, lawn tractors, and the like. For example, methods and products herein may be used as hoods or other types of panels on vehicles such as tractors and snowmobiles.

Figure 16:
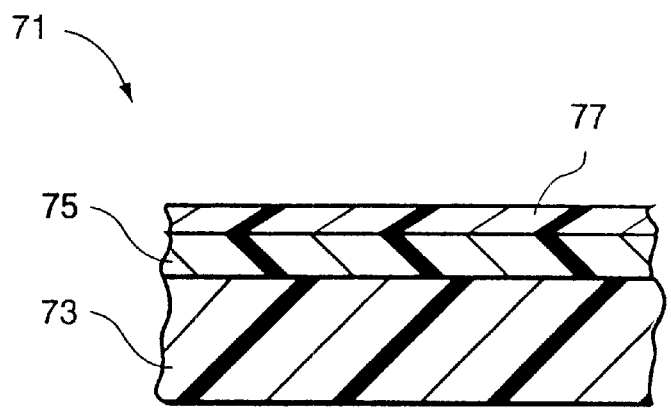
FIG. 16 is a partial cross-sectional view of an automotive trim component according to an embodiment of this invention.

FIG. 16 is a side cross-sectional view of an automotive trim component 71 according to one embodiment of this invention. Trim component 71 includes base substrate 73 preferably formed by injection molding or the like, color pigmented thermoplastic substrate 75 preferably formed by extrusion, and substantially transparent overlying clear coat layer 77 preferably formed by extrusion.

Figure 11:
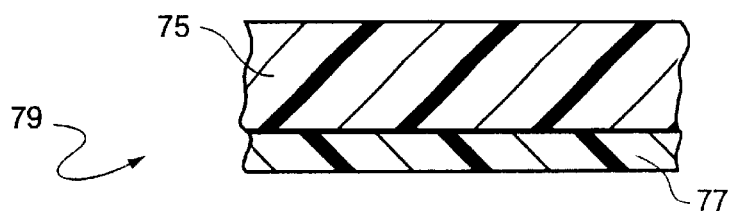
FIG. 11 is a cross-sectional view of a molded automotive trim laminate according to an embodiment of this invention.

According to certain embodiments of this invention, color pigmented layer 75 and solid (i.e. non-liquid) clear coat layer 77 may be calendared together to form laminate 79 of FIG. 11. Laminate 79 may then be vacuum-formed into approximately the shape of the desired final trim product. Vacuum-formed or thermoformed laminate 79 may then be placed into a cavity of an injection molding device, and plasticized or semi-molten resin material thereafter being injected into the cavity so as to form base substrate 73 which becomes bonded or fused to layer 75 due to the heat and pressure in the cavity. The cavity defines the three dimensional shape of the final trim product. FIG. 16 illustrates a cross-section of the final trim product of this embodiment.

In accordance with certain embodiments of this invention, the need for spraying on a paint layer and/or spraying on or otherwise applying a liquid clear coat layer is eliminated. Thus, the resulting product can be made more efficiently, with less capital expenditure as there is no need for a paint or spray line, and in a more environmentally safe manner as there is no need for solvents or other hazardous materials typically utilized in liquid application processes.

Referring to FIGS. 16 and 11, base substrate 73 may be made from any polymer-based semi-molten resin which is injected into the cavity of an injection molding device. Substrate 73 may be transparent or optionally may be colored or opaque. Molded polymer substrate 73 may be selected to provide rigidity and other desirable properties. Suitable polymers for making base substrate 73 include, for example, polyvinyl chloride, polycarbonate, polystyrene, polypropylene, polyethylene, acrylonitrile-butadiene-styrene, nylon, co-polymers, ionomers, polyolefin (TPO), homopolymers co-polymers, and urethanes. Polyolefin, homopolymers, and co-polymers are thermoplastic resins which have good moldings properties and may be used as substrate 73 in preferred embodiments. Likewise, polypropylene has many performance properties suitable for automotive exterior uses, as do acid co-polymers of polyethylene, all of which may be used as the material of substrate 73. Substrate 73 may be from about 1.0 to 5.5 mm thick, most preferably from about 2.0 mm to 4.0 mm thick.

Clear coat layer 77 is transparent or substantially transparent to visible light. In certain preferred embodiments, clear coat 77 is at least 90% transparent to visible light rays, more preferably at least 95% transparent to visible light rays, and most preferably at least about 98% transparent to visible light rays. Clear coat layer 77 is provided for giving the trim product a high gloss finish, protecting color layer 75, and providing a coating which is resistant to scratching,. abrasions, marring, heat, UV radiation, and weathering.

Clear coat 77 is also flexible and has satisfactory elongation characteristics during adhesion to color pigmented layer 75. Different types of materials may be used to make clear coat 77. Layer 77 may be made, for example, of a thermoplastic synthetic resinous composition. Clear coat 77 may, for example, include or be made of a blend of a thermoplastic fluorinated polymer and an acrylic resin where the polymer component may be a thermoplastic fluorocarbon such as polyvinylidene fluoride and the acrylic resin may be polymethyl methacrylate or polyethyl methacryate resin, or mixtures thereof. Other materials which may be utilized to form substantially transparent clear coat 77 include polycarbonate base available from Avery Dennison (Troy, Mich.) or Kurz-Hastings (Philadelphia, Pa.).

Clear layer 77 may be from about 0.000025 to 0.003 inches thick in certain embodiments of this invention. Additionally, in certain embodiments, clear coat 77 may be placed on a polyester or polyethylene carrier, with the combination being from about 0.5 to 3 mils thick. The carrier (e.g. polyester or polyethylene carrier) stays with the clear coat 77 up until the time when the clear coat is made into a formable skin. The clear coat is calendared onto the carrier between heated rollers, e.g. using the apparatus shown in FIG. 26. FIG. 27 illustrates the clear coat 77 on the carrier 78, as a laminate. For example, the self-supporting carrier may be removed after the clear coat (and other layers laminated thereto) is thermoformed into the desired three-dimensional shape, and it may be manually removed by peeling. This carrier may be from about 1.0 to 2.5 mils thick. The carrier functions to protect the clear coat during the manufacturing process and also supports the clear coat layer 77. While the carrier 78 is removed after thermoforming so that final trim products herein do no include this carrier, the carrier 78 is typically supporting the clear coat layer 77 until after it has been thermoformed (e.g. in a vacuum-forming or injection molding apparatus). Thus, when clear coat layer 77 is referred to herein in the specification (not in the claims) prior to and during thermoforming it, it is to be understood that carrier 78 may be attached thereto for protection and support.

Color pigmented thermoplastic substrate 75 is the layer in trim product 71 which determines the color of the trim product. Substrate 75 is capable of being thermoformed. The color of layer 75 is viewed from the vehicle's exterior through clear coat 77. Layer 75, in certain embodiments, may comprise a polyolefinic thermoplastic resin (TPO), color producing pigments and additives, ultraviolet stabilizers, and other additives conventionally used in thermoplastic resins for producing automotive exterior components. An exemplar material which may be used as color pigmented layer 75 in certain embodiments of this invention is Millennium III™, which is a glass-filled polycarbonate rigid sheet with optional GE Lexan™ layers on top and bottom (ABA tri-manifold coextrusion). Millennium III is available from Spartech Alloy Plastics, and is a composite product of 20% (preferably from about 10–30%) glass-filled polycarbonate that provides the physical properties of glass-filled polycarbonate with a "Class A" finish of a standard polycarbonate sheet.

Additional exemplar color materials which may be used as layer 75 include Montell Hivalloy polyolefins, where copolymer alloys are created between polyolefins (e.g. semicrystalline polymer) and normally incompatible amorphous polymers. This creates for layer 75 a continuous polyolefin matrix with dispersed amorphous phase, where polymers are chemically linked similar to a graft copolymer. The amorphous polymer components may be styrene or acrylic. This material for layer 75 has a low density of from about 0.93 to 0.95 g/cc, excellent chemical resistance, excellent weatherability (including UV resistance), etc. Both Montell Hivalloy XPA018 30% glass reinforced resin, and Hivalloy XPA052 high flow general purpose resin may be used in different embodiments of this invention. The injection pressure of these materials, if utilized, is preferably less than about 15,000 psi in certain embodiments of this invention, and most preferably less than about 10,000 psi.

In certain embodiments of this invention, color-pigmented layer 75 has a tensile modulus (ASTM D-638, incorporated herein by reference) of from about 500,000 to 700,000 psi, and more preferably from about 550,000 to 600,000 psi. In certain embodiments, layer 75 has a specific gravity of from about 0.8 to 1.3, preferably from about 0.9 to 1.2. In certain embodiments of this invention, color-pigmented layer 75 has a tensile strength (ASTM D-638, incorporated herein by reference) of at least about 10,000 psi, and preferably at least about 11,000 psi. Layer 75 may have a tensile strength of from about 11,000 to 12,000 psi. In certain embodiments of this invention, color-pigmented layer 75 has a flexural modulus (ASTM D-790, incorporated herein by reference) of from about 700,000 to 800,000 psi, preferably from about 725,000 to 750,000 psi. Also, in certain embodiments, layer 75 has a flexural modulus of from about 1900–2000 MPa average. In certain embodiments of this invention, layer 75 has a flexural strength (ASTM D-790, incorporated herein by reference) of at least about 20,000 psi. Layer 75 preferably has a flexural strength of from about 20,000 to 22,000 psi. In certain embodiments of this invention, layer 75 has a coefficient of thermal expansion (ASTM D-696, incorporated herein by reference) of from about $1.0 \times 10^{-5}$ to $5.0 \times 10^{-5}$ (in./in./degrees F), and more preferably from about $3.0 \times 10^{-5}$ to $3.5 \times 10^{-5}$. Layer 75 preferably has a coefficient of thermal expansion of at least about $3.0 \times 10^{-5}$ in./in./degrees F. In certain embodiments of this invention, layer 75 has a hardness (ASTM D-785, incorporated herein by reference) of at least about 110 (Rockwell "R"), and more preferably of at least about 115 (Rockwell "R"). In certain embodiments of this invention, layer 75 has a tensile strength at yield of from about 50–60 MPa average, a deflection temperature under load (455 kPa) of from about 90–100 C average, and a deflection temperature under load (1820 Kpa) of from about 60–65 C average. The melt temperature of layer 75 is preferably from about 400–600 degrees F. preferably from about 425–500 degrees F.

Layer 75 also has less sag than other materials such as Dow M910 ABS and Centrex 811 ASA. For example, in certain embodiments, when a 6.5 inch span of layer 75 is exposed to 250 degrees F for one hour to measure sagging of the layer, suspended layer 75 sags downward less than about 0.5 inches, preferably less than about 0.3 inches.

In certain embodiments of this invention, color-pigmented layer 75 may have (e.g. Hivalloy Acrylic/PP WXPA011 from Montell, SAE J1960, exterior) a color shift (Delta E), black, of less than about 0.5, preferably less than or equal to about 0.3, and most preferably less than or equal to about 0.2 (e.g. material 1800 kJ/m²). Layer 75 may have a color change after 2500 kJ/m² of less than about 0.3. Layer 75, alone, in certain embodiments of this invention, may have a gloss retention [e.g. black color, initial 90.1, 60 degree angle, 2500 kJ/m², to 84] of at least about 90% and preferably of at least about 93%. At another angle (e.g. 20 degrees viewing), layer 75, alone, in certain embodiments of this invention has a gloss retention [e.g. black color, initial 83.2, 20 degree angle, 2500 kJ/m², to 74.1] of at least about 80%, and preferably of at least about 89% at this 20 degree angle. Layer 75, alone in certain embodiments, when run through 6 months SAE J1976, Florida Test (60 degree gloss), has a gloss retention of at least about 90%, and preferably of at least about 95.0% [ΔE=0.12, ΔL=0.05, Δ=0, Δb=0.09, Δc=0.08]. As for white color in certain embodiments of this invention, layer 75 has a gloss retention of at least about 99% [ΔE=1.8, SAE J1960 Montell Hivalloy acrylic/pp copolymer WXPA012].

With regard to chemical resistance, color-pigmented layer 75 preferably passes each of the following tests, for each of which the following chemicals were applied with a gause swab and exposure was for 48 hours. The tests were passed because after application and exposure, visual inspection evidenced that there was no cracks or crazing observed. The tests passed were as follows: (a) at 23 degrees C, 0% strain level, the test was passed for each of windshield washer fluid, automatic transmission fluid, tar and road oil remover, brake fluid, coolant concentrate, motor oil, and ASTM Fuel C+15% MeOH being separately applied to layer 75; (b) at 60 degrees C, 0.0% strain level, the test was passed for each of the chemicals in (a) above except the fuel; (c) at 23 degrees C, 0.5% strain level, the test was passed for each of the chemicals in (a) above; (d) at 60 degrees C, 0.5 degrees C, the test was passed for each of the chemicals in (a) above except the fuel; (e) at 23 degrees C, 1.0% strain level, the test was passed for each of the chemicals in (a) above; and (f) at 60 degrees C, 1.0% strain level, the test was passed for each of the chemicals in (a) above except the fuel. Montell Hivalloy WXPA011 is an exemplar material for layer 75. Many conventional materials, such as Luran S ASA and Xenoy 1731 craze or crack and do not pass many of the above tests (especially the tar and road oil remover, brake fluid, coolant concentrate, and washer fluid when strain is applied).

The color imparted to layer 75 may be imparted by ingredients and techniques known in the art. The color pigmentation of the resin layer 75 is carried out to produce a desired value on a color chart. Typically; the coloration is provided to the resin substrate 75 utilizing various combinations of color pigment additives such as titanium dioxide, blue tone phthalocyanine green, yellow tone phthalocyanine green, green tone phthalocyanine blue, lamp black, and/or carbon black. The amounts of color additives and the particular combinations thereof utilized to achieve desired color in layer 75 are known in the art.

Ultraviolet radiation deterioration preventing elements may also be provided in layer 75 or layer 77. These include carbon black, white pigments, organic ultraviolet stabilizers, and other pigments which absorb and/or reflect ultraviolet radiation.

Referring now to FIGS. 11–26, it will be described how automotive trim product 71 is manufactured according to a first embodiment of this invention. To begin with, an extruded color pigmented thermoplastic layer 75 and a separate substantially transparent clear coat web or layer 77 are provided. These two layers 75 and 77 are then laminated or bonded together by way of, for example, the apparatus shown-in FIG. 26. The clear coat web or. layer 77 may be unwound from roll 81 while color layer 75 is simultaneously unwound from roll 83. After passing over guide rollers 85, color layer 75 and clear coat layer 77 meet at the nip between heated chrome coated rollers 87 and 89. The surfaces of rollers 87 and 89 may be oil-heated to a temperature of from about 220° F.–275° F. The pressure between rollers 87 and 89 may be from about 15–50 lbs. per sq. inch in certain embodiments of this invention, more preferably from about 15–30 lbs. per sq. inch, and most preferably from about 15–20 lbs. per sq. inch. When layers 75 and 77 pass between rollers 87 and 89, this pressure and heat causes the two layers to mechanically bond (be laminated together). The resulting laminate 79 is fed away from rollers 87 and 89 and preferably stored on a roll. A cross-section of laminate 79 is shown in FIG. 11.

Figure 3:
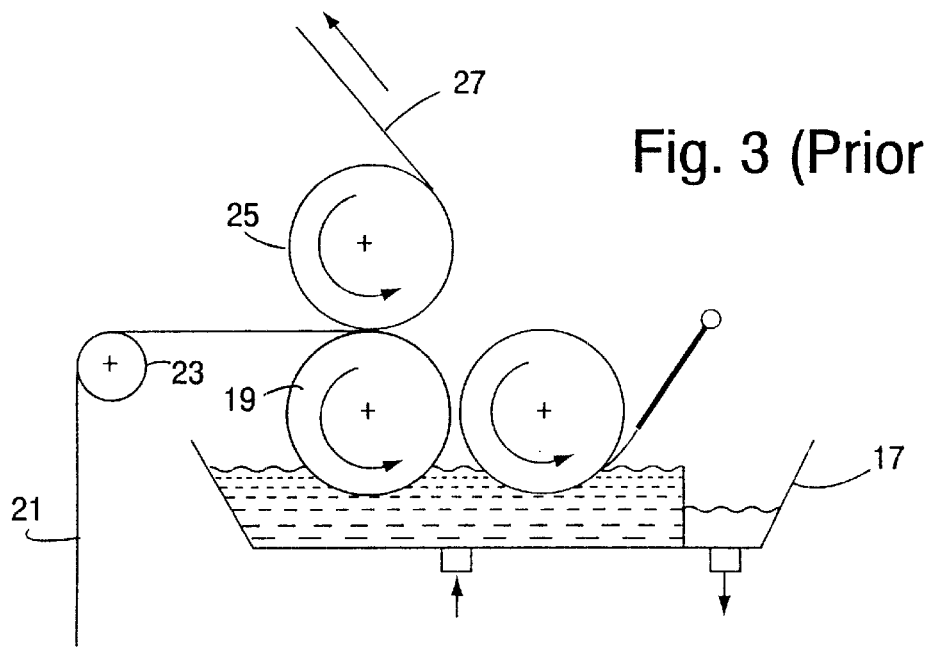
FIG. 3 is a prior art schematic side elevation view illustrating a step during the process of making the laminate of FIG. 2.
Figure 4:
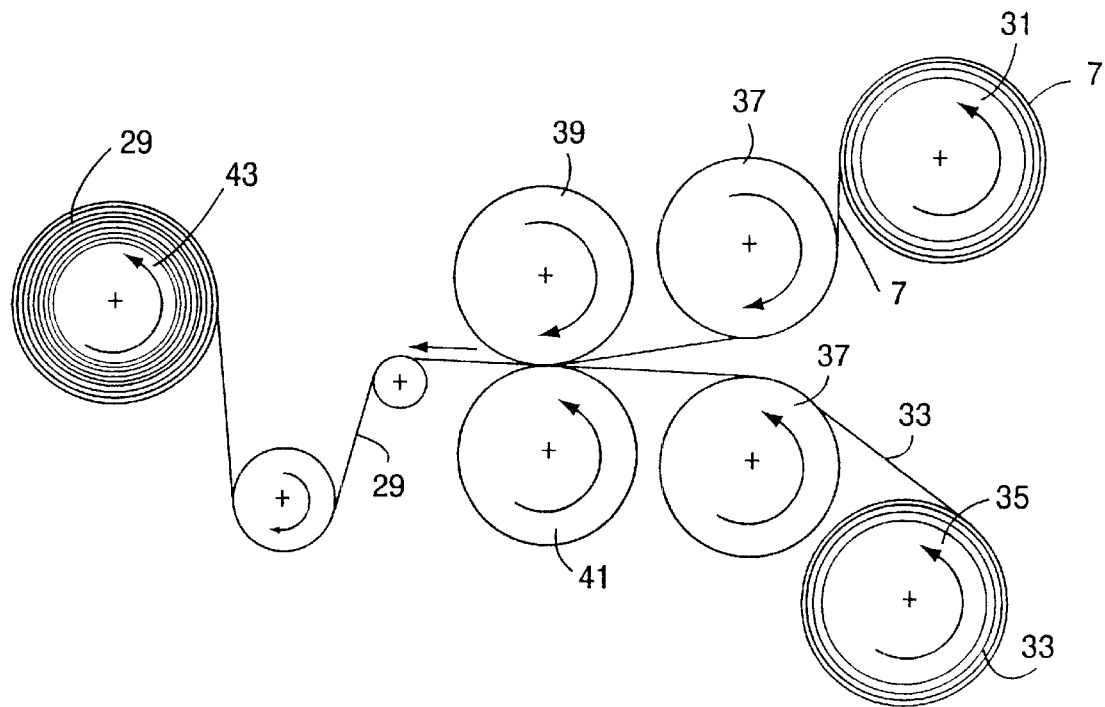
FIG. 4 is a prior art schematic side view illustrating a laminating step used in making the laminate of FIG. 5.
Figure 5:
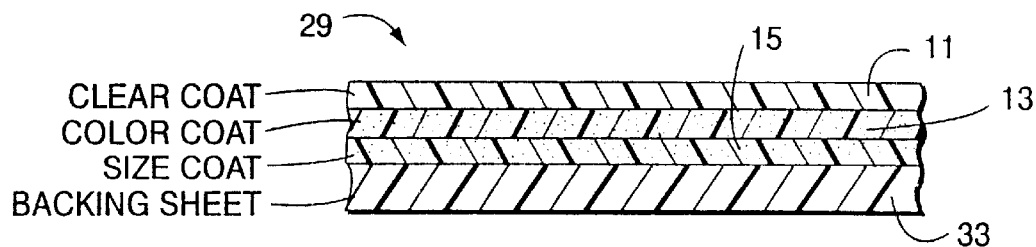
FIG. 5 is a prior art cross-sectional view illustrating a dry composite paint coat transferred to a backing sheet during the laminating step (it is noted that film thicknesses are exaggerated in the drawings herein and are not to scale, for purposes of simplicity).
Figure 6:
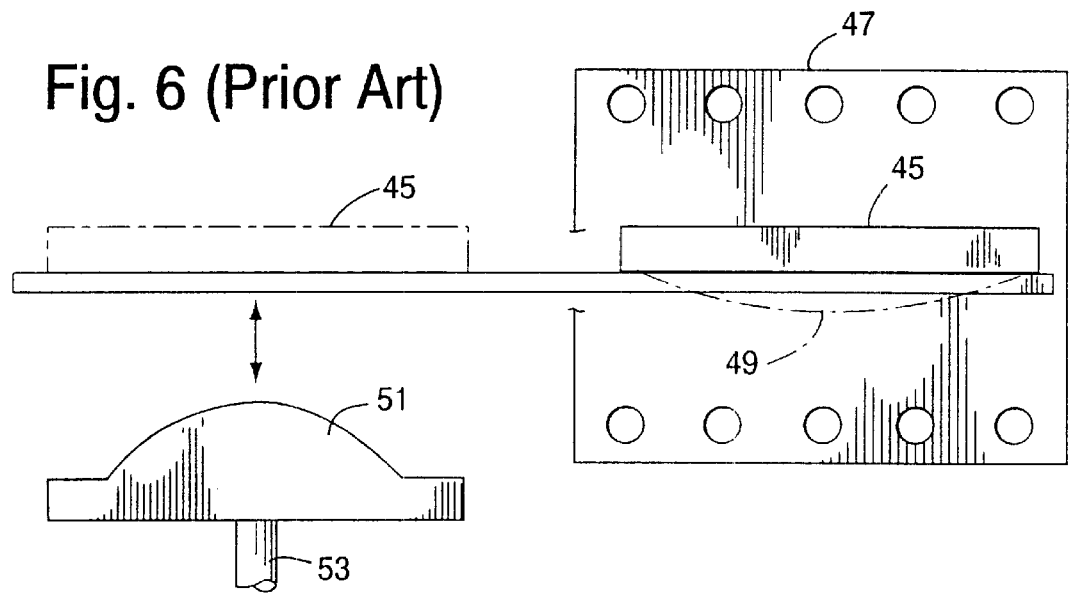
FIG. 6 is a prior art schematic view illustrating a thermoforming step in which a paint-coated laminate of FIG. 5 is heated prior to vacuum-forming.
Figure 7:
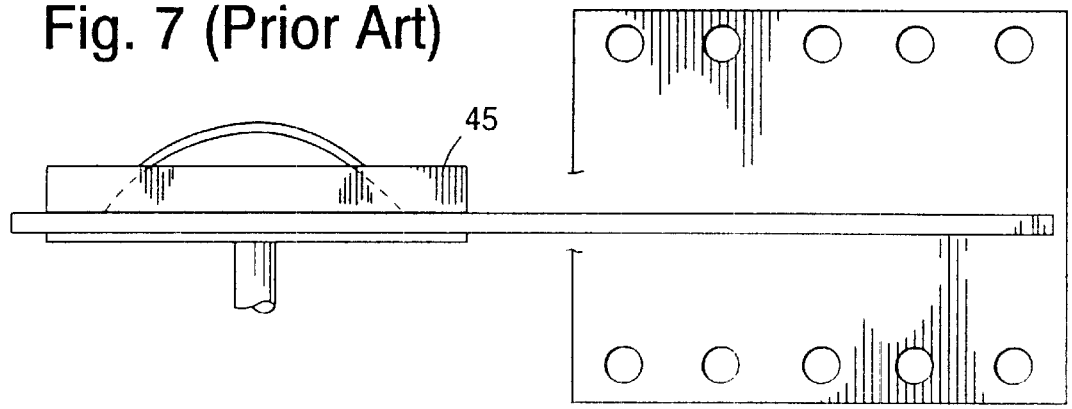
FIG. 7 is a prior art schematic view illustrating vacuum-forming of the FIGS. 5–6 laminate.
Figure 8:
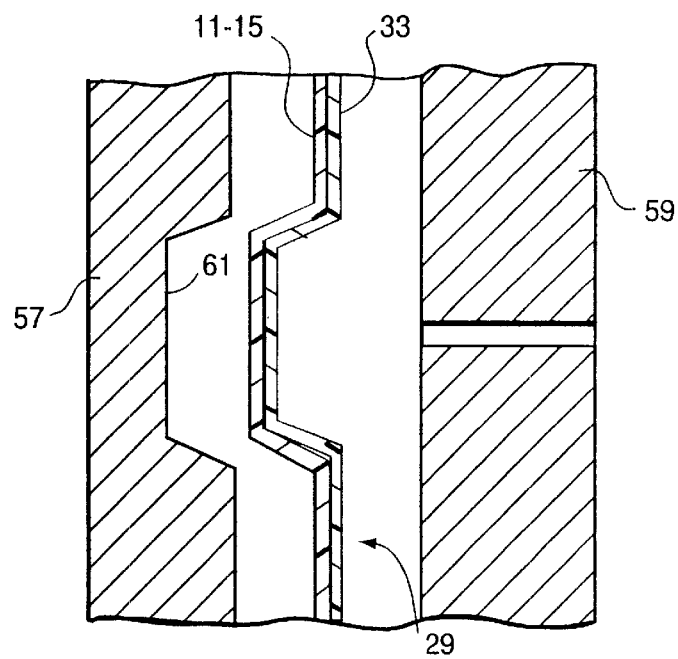
FIG. 8 is a prior art cross-sectional view illustrating a preliminary step in which a vacuum-formed laminate is inserted into the cavity of an injection molding device.
Figure 9:
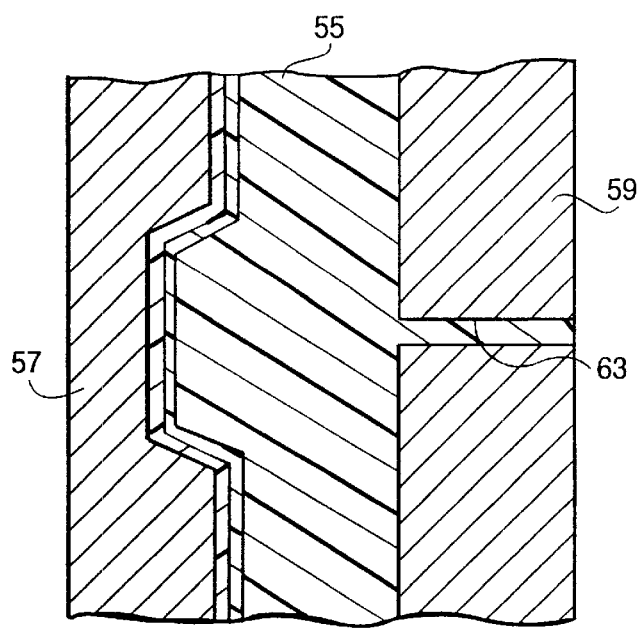
FIG. 9 is a prior art cross-sectional view illustrating the injection of plasticized or semi-molten material into the FIG. 8 injection molding device behind the vacuum-formed laminate in order to form a molded automotive trim component or product.
Figure 10:
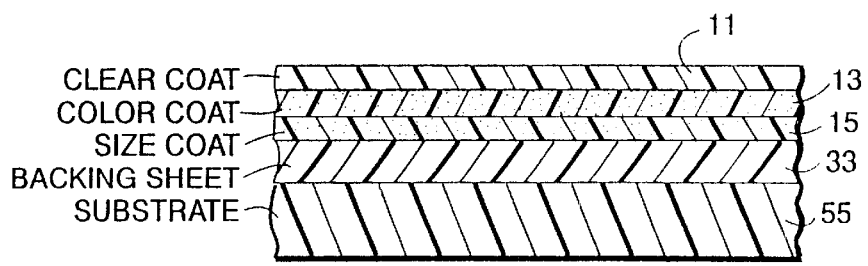
FIG. 10 is a prior art cross-sectional view of a section of the automotive trim component formed in FIG. 9.
Figure 12:
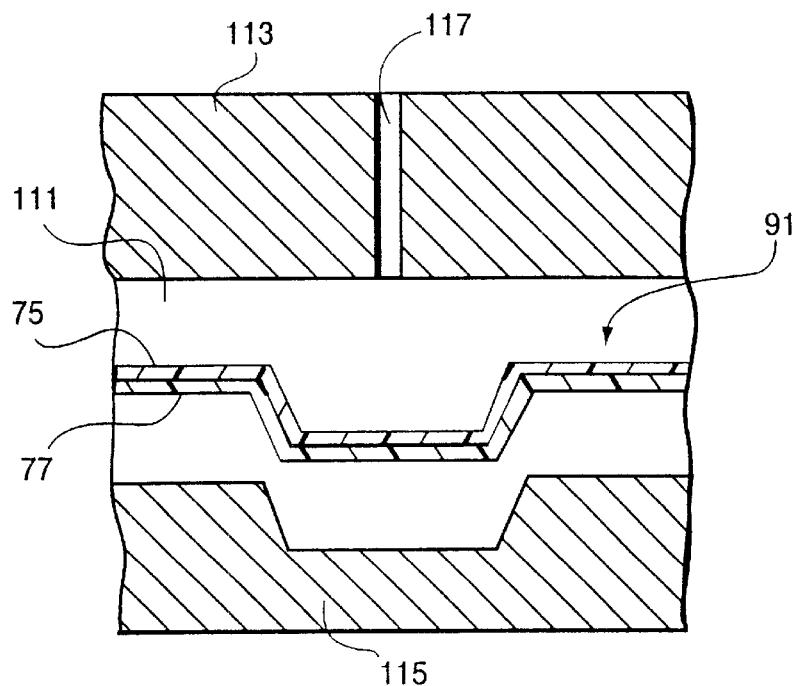
FIG. 12 is a cross-sectional view of a vacuum-formed automotive trim component being inserted into an injection molding device according to an embodiment of this invention.
Figure 13:
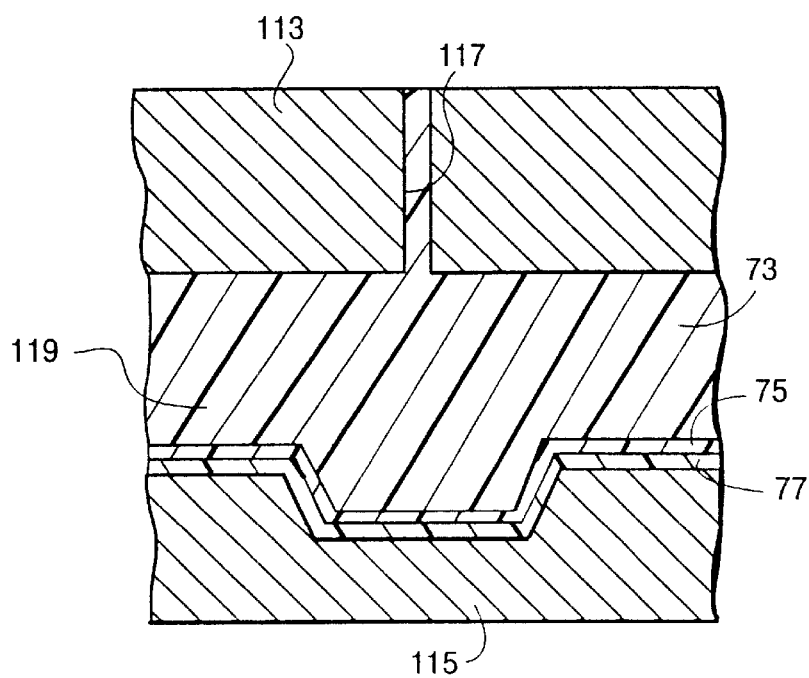
FIG. 13 is a cross-sectional view illustrating plasticized material being injected into the FIG. 12 molding cavity behind the vacuum-formed laminate in order to manufacture a molded and colored automotive trim component according to an embodiment of this invention.

Laminate 79 may then be thermo-formed into a shape approximating that of the desired final automotive trim product by way of vacuum-forming the laminate in either the device of FIGS. 6–7, or the vacuum-forming device of FIGS. 22–23. If the FIGS. 6–7 vacuum-forming device is used, then laminate 79 is placed into clamping frame 45. Clamping frame 45 is then moved along a track into oven 47 for heating laminate 79 to a thermo-forming temperature. Laminate 79 may be heated in oven 47 to a temperature of from about 250°–400° F. As the preheated laminate 79 (or 49) sags as shown in FIG. 6, it is moved along with the clamping frame 45 back to its original position above vacuum-forming buck 51. Laminate 79 is then vacuum-formed into the desired three dimensional approximate shape. A vacuum is drawn on buck 51 through connection 53 to a vacuum pump. Buck 51 is then moved toward and into clamping frame 45, where the vacuum is pulled through holes in the working surface of buck 51 to force the molten plastic of laminate 79 into the shape of the working surface of the buck. Optionally, positive air pressure may be applied to the free face of the laminate on the opposite side of the buck in order to increase forming pressure. It is noted that during the vacuum-forming process, it is preferable that color layer 75 be in contact with the working surface of buck 51. Buck 51 stays in place long enough to cool the plastic laminate 79 to a solid state again before the buck drops away from frame 45. The result is a thermo-formed and three dimensionally shaped laminate 91 which is shown in FIG. 12. The shape of laminate 91 corresponds to the working surface of buck 51.

It is also possible to utilize the vacuum-forming device of FIGS. 22–23 to form substantially planar laminate 79 into three dimensionally shaped laminate 91. Referring to FIGS. 22–24, the vacuum-forming apparatus includes vacuum molding buck or dye 99, a plurality of vacuum suction holes 101 in dye 99, and vacuum suction pump 103 which communicates with holes 101 via conduit 105. An on/off valve 107 is provided so that vacuum pump 103 may selectively vacuum air through holes 101. Substantially planar laminate 79 is softened by heating it to a preheating temperature as discussed above. Following preheating, buck or dye 99 may be raised toward laminate 79 and vacuum 103 applied to draw the color layer surface 75 of laminate 79 into contact with the working surface of dye 99 as shown in FIG. 23. After it is cooled, the resulting vacuum-formed laminate 91 is illustrated in FIG. 24, having a three dimensional shape approximating that of the desired final automotive trim component. While the shape illustrated in FIG. 24 is not identical to the shape of vacuum-formed laminate 91 in FIG. 12, it is pointed out that the vacuum-formed shape depends on the buck or dye of the vacuum-forming apparatus, and that the illustrated shapes are provided for purposes of example only. Either male or female bucks may be used in vacuum-forming devices in different embodiments of this invention.

The vacuum-formed three dimensionally shaped laminate 91 is then placed into cavity 111 of an injection molding apparatus as shown in either of FIGS. 12 and 25. FIGS. 12 and 25 both illustrate cavities of different injection molding apparatus devices, with the cavities differing by at least the three dimensional shape of the desired end product. The components of the injection molding devices of FIGS. 12 and 25 will be referred to using the same reference numbers for similar device components.

Referring to FIGS. 12 and 25, the injection molding device includes first and second mold halves 113 and 115. The inner surface of mold half or dye 115 is three dimensionally shaped so as to approximately match the shape of the exterior surface of clear coat layer 77 of vacuum-formed laminate 91. Laminate 91 is placed into cavity 111 so that clear coat layer 77 of laminate 91 comes to rest against the working surface of dye 115. Thereafter, semi-molten plastic resin 119 is injected into cavity 111 through aperture 117 provided in dye 113 in order to form molded base substrate 73. The pressure from the injecting of semi-molten resin 119 into cavity 111, combined with the temperature within the cavity and the surface of dye 115, causes the semi-molten resin 119 to fuse together with (or bond with) vacuum-formed color pigmented thermoplastic layer 75. The result is three layered laminate 71 as shown in FIG. 16, which is three dimensionally molded for the desired exterior automotive application. This represents the final trim product in this embodiment.

Figure 14:
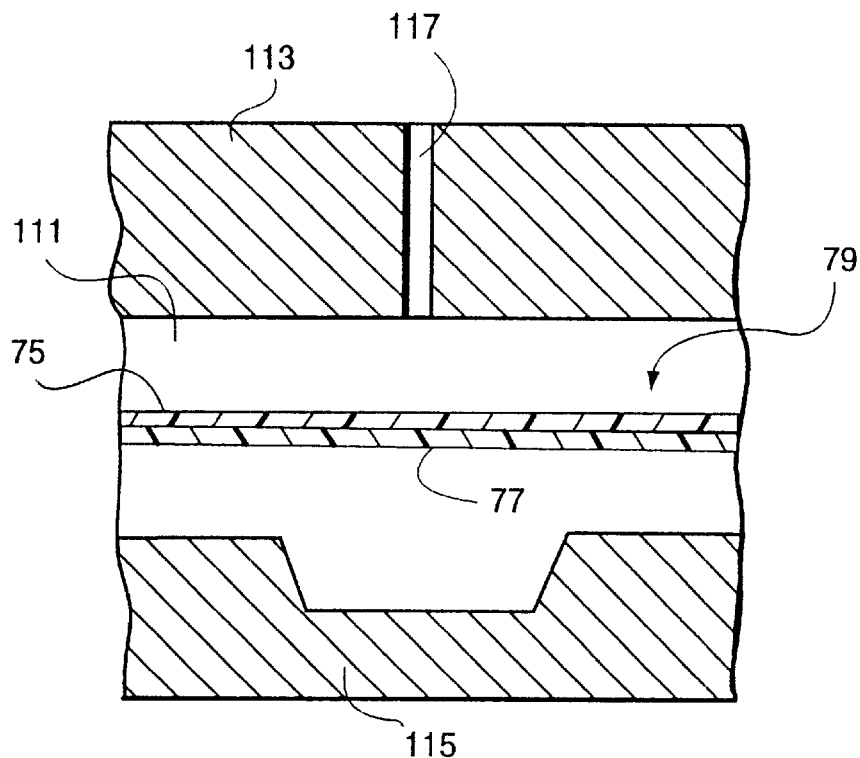
FIG. 14 is a cross-sectional view illustrating a substantially planar colored laminate being inserted into an injection molding device according to an embodiment of this invention.
Figure 15:
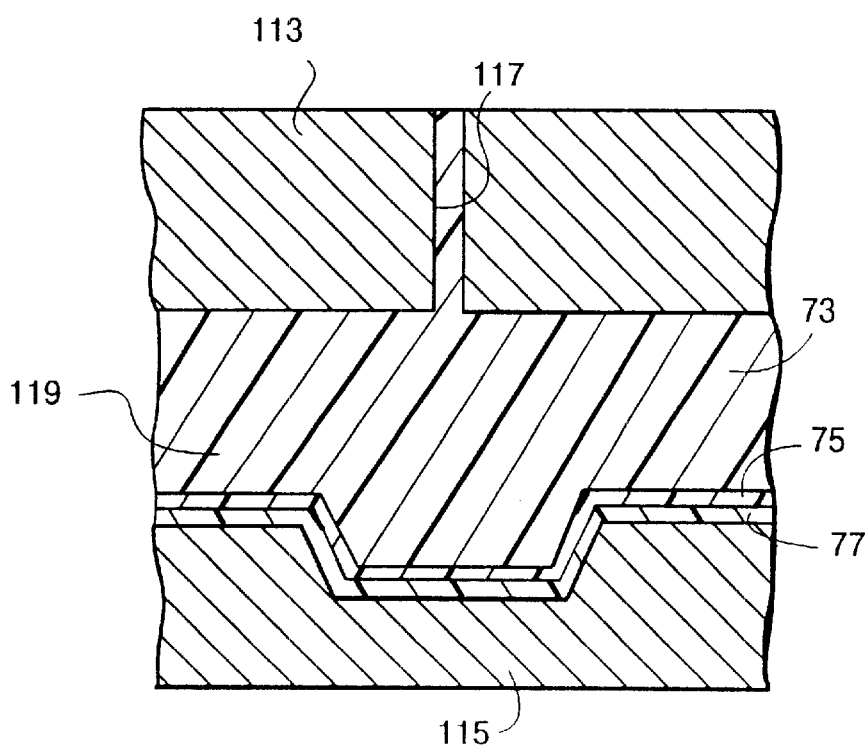
FIG. 15 is a cross-sectional view illustrating plasticized material being injected into the molding device of FIG. 14 in order to form a molded automotive trim component according to an embodiment of this invention.

According to another embodiment of this invention, trim product 71 may be manufactured without vacuum-forming. Referring to FIGS. 14–15, thin and/or flexible substantially planar laminate 79 may be placed into cavity 111 of an injection molding device without having previously been vacuum-formed or otherwise pre-formed. After the substantially planar laminate 79 is located within cavity 111, semi-molten plastic resin is injected into cavity 111 through aperture 117. The pressure caused by the injection of resin 119 into cavity 111, together with the temperature of the resin and the surface of dye 115, causes laminate 79 to be pressed tightly against the working surface of mold dye 115 resulting in layer 75 and 77 of laminate 79 being molded in the shape of dye 115 as shown in FIG. 15. The resin 119 which forms substrate 73 is also in the form of the mold. After being cooled, the result is the final automotive trim product, a cross-section of which is illustrated in FIG. 16.

Figure 18:
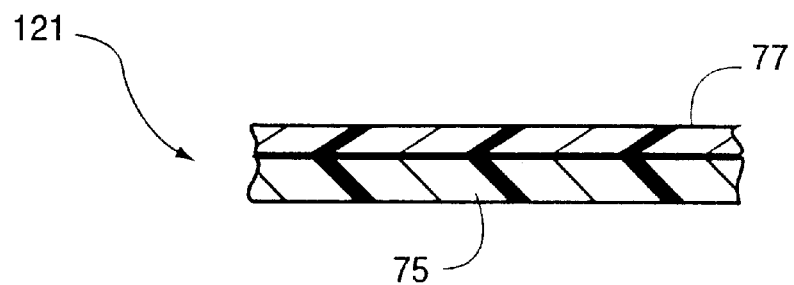
FIG. 18 is a partial cross-sectional view of an automotive trim component according to yet another embodiment of this invention.

FIG. 18 is a cross-sectional view of a final automotive trim product 121 according to still another embodiment of this invention. Trim product 121 includes clear coat layer 77 and color pigmented thermoplastic substrate layer 75. No base substrate 73 is provided or required in this embodiment. Trim product 121 may be manufactured as follows. Planar laminate 79 may be manufactured as discussed above. Laminate 79 may then be vacuum-formed as discussed above. Following such vacuum-forming, trimming and cooling, we have the final three dimensionally molded trim product 121 shown in FIG. 18. Injection molding is not utilized. It is noted that in accordance with the FIG. 18 embodiment of this invention, pigmented color substrate layer 75 may be relatively thicker than the same color layer 75 in the FIG. 16 embodiment. For example, color pigmented substrate 75 of trim product 121 may have a thickness of at least about 0.060 inches.

Figure 17:
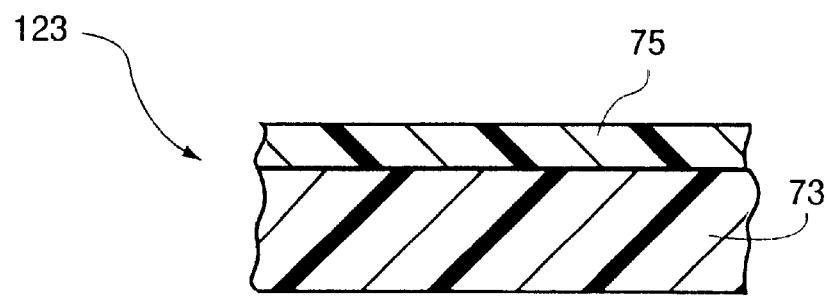
FIG. 17 is a cross-sectional view of an automotive trim component according to another embodiment of this invention.

FIG. 17 illustrates a cross-sectional view of a portion of a final automotive trim product 123 according to yet another embodiment of this invention. The trim product of this embodiment includes base substrate 73 and color pigmented thermoplastic substrate layer 75, but no clear coat layer. Trim product 123 may be manufactured in certain embodiments of this invention by vacuum-forming color layer 75 (without a clear coat layer thereon) as described above into a skin. The three dimensionally vacuum-formed skin, consisting of layer 75, is then placed into an injection mold cavity 111 as described above, and semi-molten plastic material is then injected into the mold-cavity behind the skin so as to form substrate 73. Thus, trim product 123 may be manufactured without the need for the rolling assembly illustrated in FIG. 26.

According to still another embodiment of this invention, clear coat layer 77 can be laminated to a bright metallic foil (e.g. Al or chrome) layer (i.e. layer 75 may be this metallic foil-like layer). This composite may thereafter be vacuum-formed as discussed above, then placed into the cavity 111 of an injection molding device. Then, semi-molten resin can be injected into the cavity 111 behind the laminate and allowed to cure, so that the resulting three-layer product has the appearance of a chrome plated trim part. In such embodiments, the foil layer may be from about 0.005 to 0.008 inches thick (e.g. chrome foil or brite Al foil), and the clear coat layer 77 may be from about 0.000025 to 0.003 inches thick. This embodiment is advantageous in that conventional chrome is easy to scratch and weathers easily. The foil layer may or may not be provided on a carrier layer in different embodiments of this invention.

In another embodiment of this invention, a single layer of clear coat 77 may be vacuum formed by itself into a skin. Such a layer can be from about 3–7 mils thick. After vacuum-forming, the molded clear layer is placed into the cavity 111 of an injection molding device and semi-molten color-pigmented resin is injected into the cavity behind it to a thickness of from about 1.5 to 5 mm thick to result in the final two-layer trim product.

Figure 19:
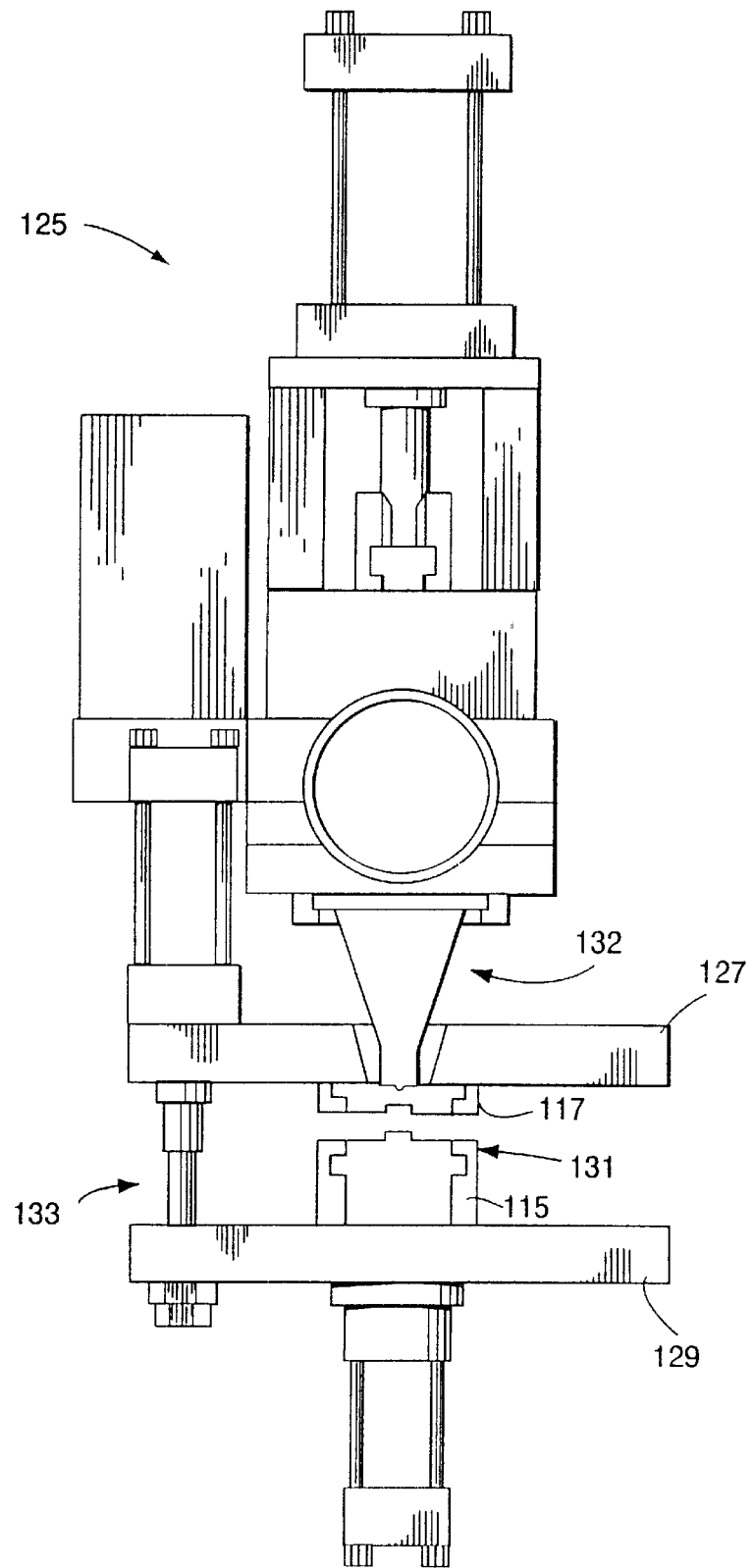
FIG. 19 is a perspective view illustrating an injection molding device which may be utilized to manufacture automotive trim components according to any of the different embodiments of this invention.
Figure 20:
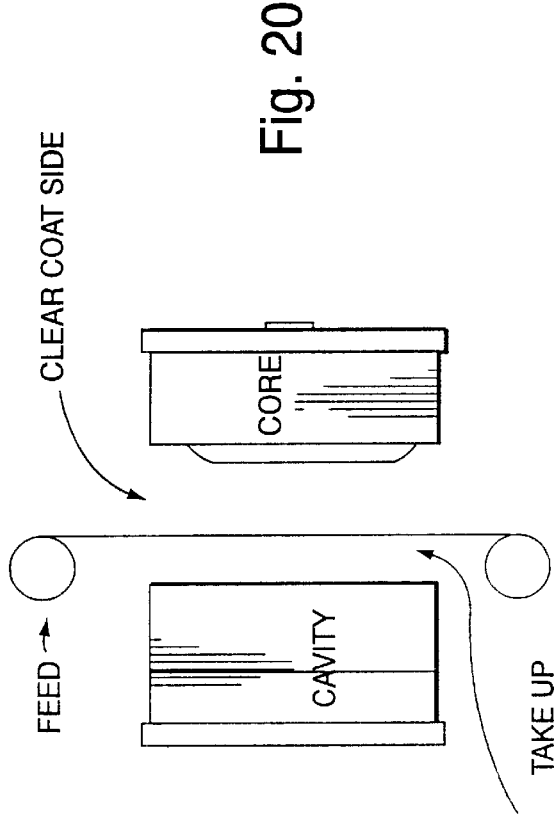
FIG. 20 is a perspective view illustrating a composite made up of a thin clear coat on a color pigmented substrate being positioned within the cavity of either an injection molding device or a vacuum-forming device according to certain embodiments of this invention.
Figure 21:
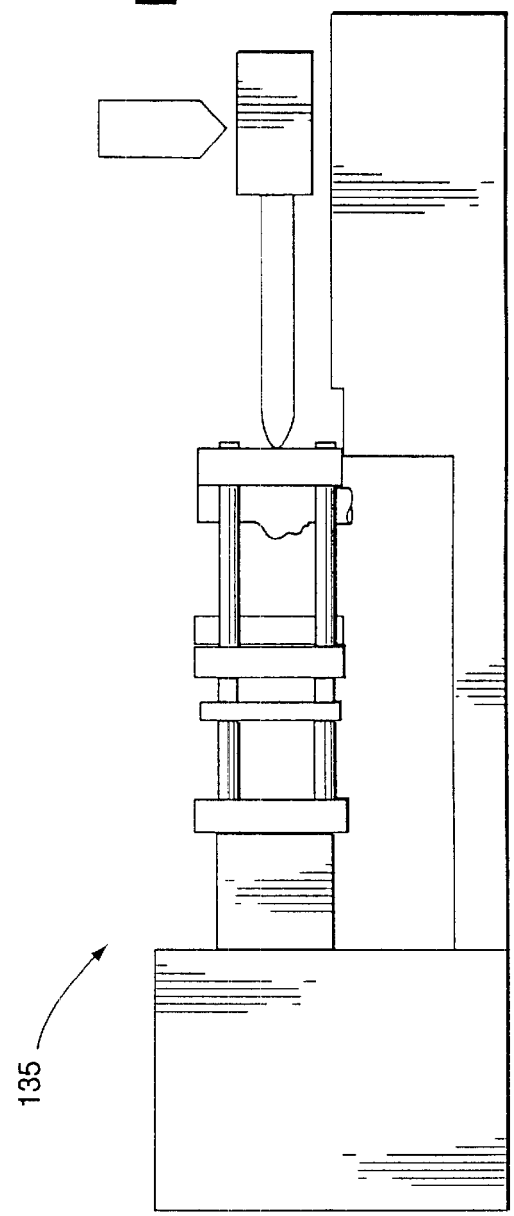
FIG. 21 is a perspective view of an injecting molding device which may be utilized in the manufacture of automotive trim components according to any of the different embodiments of this invention.

FIG. 19 generally illustrates an injection molding device 125 which may be utilized in any of the aforesaid embodiments of this invention. Referring to FIG. 19, injection molding apparatus 125 includes stationary platen 127, movable platen 129, mold unit 131 including dies 115 and 117 located between platens 127 and 129, injection mechanism 132 attached to platen 127, and mold clamping device 133 attached to movable platen 129. The injection mechanism 132 includes a heating cylinder, a screw, a plasticizing space defined between the heating cylinder and the screw, a nozzle, a hopper, a plunger, and a sleeve which are illustrated and described in more detail in either of U.S. Pat. Nos. 5,562,931 or 5,486,327, the disclosures of which are both hereby incorporated herein by reference. Injection device 132 causes the semi-molten resin material to be injected into the cavity 111 as described above by way of an aperture 117 defined in one of the mold halves. FIG. 21 illustrates another injection molding device 135 which is similar to device 125 of FIG. 19. Either vertical or horizontal injection molding devices may be utilized according to different embodiments of this invention.

The injection molding device of FIG. 25, which also may be used in any of the embodiments of this invention, may function as both an injection molding device including cavity 111 as well as a vacuum-forming device including vacuum 103, valve 107, conduit 105, and die 99 (or 115). Thus, the vacuum-forming and injection molding may be done in separate devices as described above, or alternatively may be carried out in a single device as illustrated in FIG. 25.

The final automotive trim products 71 and 121 described above are scratch resistant, have good durability, high gloss, good strength hardness, and satisfactory ultraviolet stabilization. These properties are described relative to the surface of the products viewed on the exterior of a vehicle (i.e. the clear coat side of the products). The degree of these physical characteristics regarding gloss, DOI, color uniformity, gasoline resistance, cleanability, acid spot resistance, hardness, abrasion resistance, impact strength, UV resistance, and water/humidity resistance is described below.

These trim products, with regard to gloss, preferably have a specular reflectance for the clear coat surface of at least about 60–65 gloss units at an angle of 20° from normal, and at least about 75–80 gloss units at an angle of 60° from normal. Specular reflectance and other criteria herein are measured prior to buffing and waxing, and a preferred test method is described in GM test specification TM-204-A.

Distinctiveness of image (DOI) is a measurement of the clarity of an image reflected by the finished surface. Each of these products has a DOI of at least about 60 units, where 100 is the maximum DOI reading, measured by a Hunter Lab, Model No. D47R-6F Dorigon gloss meter. Details of this DOI test procedure are described in GM test specification GM-204-M which is incorporated herein by reference.

With regard to gasoline resistance, each of these products experiences substantially no color change, degradation, tackiness, marring, or the like after being immersed for 10 seconds, ten (10) times, in gasoline with a 20 second dry off period between each immersion. Immediately after the tenth immersion, the surface of these products preferably passes the thumbnail hardness test according to GM test specification TM-55-6, which is incorporated herein by reference.

With regard to cleanability, each of the aforesaid products preferably can withstand ten rubs with cheesecloth saturated with 9981062 Naphtha (or currently used in other approved cleaning solvents), with no substantial evidence of staining, discoloration, or softening of the exterior surface. This test requires no evidence of color transfer from the test part to the cloth. One rub consists of one forward and backward motion.

With regard to acid spotting resistance, each of the aforesaid trim products preferably withstands exposure to 0.1 N sulfuric acid for sixteen (16) hours without any evidence of staining, discoloration, or softening of the painted surface.

As for hardness, each of the aforesaid trim products has a hardness of at least four based upon the Knoop hardness test, which is incorporated herein by reference.

As for abrasion resistance, each of the aforesaid trim parts preferably can withstand the Gravelometer standard test identified in SAE J-400 at −10° F. with a minimum rating of 8, this test method being incorporated herein by reference.

As for impact strength, each of the aforesaid trim products preferably can withstand at least 20 lbs. per inch of direct impact with no failure.

As for UV resistance, also known as accelerated weathering or QUV, each of the aforesaid products preferably does not show any significant surface deterioration or embrittlement, loss of adhesion, objectionable shrinking, or noticeable color or gloss change after about 500–1,000 hours exposure to UV light and condensation apparatus per ASTM G-53 using eight hour UV cycle at 70° C. and four hour humidity cycle at 50° C., this test procedure being incorporated herein by reference.

As for water and humidity exposure, each of the aforesaid trim products preferably can withstand ninety-six hours of humidity exposure at 100% relative humidity and 100° F. in a humidity cabinet defined in GM test specification TM553 (incorporated herein by reference), and a two hour water immersion test at 100° F. according to GM test specification TM55-12 (incorporated herein by reference). The resulting product preferably shows no evidence of blistering when examined one minute after removal from the test cabinet. Additionally, each of the aforesaid final trim products preferably can withstand fifteen cycles of moisture-cold cycle test defined in GM test specification TM45-61A (incorporated herein by reference), without experiencing any visible signs of cracking or blistering.

In alternative embodiments, methods herein may be used to produce products that simulate glass windows (e.g. windshields, side windows, sunroofs, etc.) and the like. Any of the aforesaid embodiments may be used for this purpose, with all layers (e.g. 73, 75, 77) of the product being substantially transparent to visible light (e.g. at least about 40% percent, and preferably at least about 70%, transparent to visible light) when it is desirable to simulate clear windows. When it is desired to simulate tinted-windows, all layers (e.g. 73, 75, 77) are at least about 10% (preferably at least about 20%, and most preferably about 25%) transparent to visible light rays. In certain glass simulating embodiments of this invention, the clear coat layer 77 may be extruded along with layer 75. These two layers may then be vacuum formed together into a three dimensional form or shape that may be used as a windshield, window, or sunroof on an automobile, or in place of glass in any other suitable application. Polycarbonate clear substrates may be used in certain of these glass simulating embodiments of this invention, as layer 75 and/or 73.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. An automotive trim product comprising:
   an opaque extruded color layer comprising polyolefinic thermoplastic resin and including color pigment material, the color layer being formed by extrusion, wherein only one opaque extruded color layer comprising polyolefinic thermoplastic resin is provided;
   a substantially transparent layer, that is at least 90% transparent to visible light, provided over said extruded color layer, wherein said substantially transparent layer comprises a thermoplastic fluorinated polymer, and wherein only one substantially transparent layer comprising a thermoplastic fluorinated polymer is provided in the trim product; and
   wherein said substantially transparent layer and said extruded color layer are thermoformed into a shape useable in an automotive trim product.

2. The automotive trim product of claim 1, wherein said thermoplastic fluorinated polymer comprises polyvinyl fluoride.

3. The automotive trim product of claim 2, wherein the polyvinyl fluoride comprises polyvinylidene fluoride.

4. The automotive trim product of claim 1, wherein said substantially transparent layer provides a high gloss finish.

5. The automotive trim product of claim 1, wherein the substantially transparent layer and the extruded color layer are vacuum-formed into the shape useable in an automotive trim product.

6. The automotive trim product of claim 1, wherein the substantially transparent layer is laminated to a removable carrier layer.

7. The automotive trim product of claim 1, wherein the substantially transparent layer has a thickness of from 3–7 mils.

8. The automotive trim product of claim 1, wherein the substantially transparent layer includes color pigment material therein.

9. An automotive trim product comprising:

a bright metallic foil layer;

an extruded substantially transparent layer, that is at least 90% transparent to visible light, provided over said foil layer; and wherein said extruded substantially transparent layer and said foil layer are thermoformed together into a shape useable in an automotive trim product.

10. The automotive trim product of claim 9, wherein the substantially transparent layer comprises a thermoplastic fluorinated polymer.

11. The automotive trim product of claim 10, wherein said thermoplastic fluorinated polymer comprises polyvinyl fluoride.

12. The automotive trim product of claim 11, wherein the polyvinyl fluoride comprises polyvinylidene fluoride.

13. The automotive trim product of claim 10, wherein said substantially transparent layer includes color pigment material therein.

14. The automotive trim product of claim 9, wherein said foil layer comprises at least one of Al or Cr.

15. The automotive trim product of claim 9, further comprising an injection molded polymer inclusive base layer provided so that said foil layer is located between said substantially transparent layer and said injection molded polymer inclusive layer.

16. The trim product of claim 1, wherein the substantially transparent layer is extruded.

17. The trim product of claim 1, wherein the opaque extruded color layer comprises metallic particles therein.

* * * * *